United States Patent
Sierra et al.

(10) Patent No.: US 10,552,631 B2
(45) Date of Patent: *Feb. 4, 2020

(54) EFFICIENT IMPLEMENTATION FOR DIFFERENTIAL PRIVACY USING CRYPTOGRAPHIC FUNCTIONS

(71) Applicant: Apple Inc., Cupertino, CA (US)

(72) Inventors: Yannick L. Sierra, San Francisco, CA (US); Abhradeep Guha Thakurta, San Jose, CA (US); Umesh S. Vaishampayan, Santa Clara, CA (US); John C. Hurley, Santa Clara, CA (US); Keaton F. Mowery, Redwood City, CA (US); Michael Brouwer, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/297,464

(22) Filed: Mar. 8, 2019

(65) Prior Publication Data

US 2019/0205561 A1    Jul. 4, 2019

Related U.S. Application Data

(63) Continuation of application No. 15/275,284, filed on Sep. 23, 2016, now Pat. No. 10,229,282.
(Continued)

(51) Int. Cl.
*G06F 21/62* (2013.01)
*H04L 9/06* (2006.01)
(Continued)

(52) U.S. Cl.
CPC ...... *G06F 21/6218* (2013.01); *G06F 21/6245* (2013.01); *H04L 9/0631* (2013.01);
(Continued)

(58) Field of Classification Search
CPC ............ G06F 21/6218; G06F 21/6245; H04L 9/0861; H04L 9/0631; H04L 63/0421; H04L 63/0435
See application file for complete search history.

(56) References Cited

U.S. PATENT DOCUMENTS

| 7,480,687 B2 | 1/2009 | Dirscherl et al. |
| 8,443,020 B2 | 5/2013 | Matsui |

(Continued)

OTHER PUBLICATIONS

Raef Bassily and Adam Smith, "Local, Private, Efficient Protocols for Succinct Histograms", Proceedings of the Forty-Seventh Annual ACM on Symposium on Theory of Computing, Apr. 2015, 27 Pages, New York NY USA.
(Continued)

*Primary Examiner* — Mohammed Waliullah
(74) *Attorney, Agent, or Firm* — Jaffery Watson Mendonsa & Hamilton LLP

(57) ABSTRACT

One embodiment provides a system that implements a 1-bit protocol for differential privacy for a set of client devices that transmit information to a server. Implementations may leverage specialized instruction sets or engines built into the hardware or firmware of a client device to improve the efficiency of the protocol. For example, a client device may utilize these cryptographic functions to randomize information sent to the server. In one embodiment, the client device may use cryptographic functions such as hashes including SHA or block ciphers including AES to provide an efficient mechanism for implementing differential privacy.

31 Claims, 12 Drawing Sheets

Related U.S. Application Data

(60) Provisional application No. 62/349,055, filed on Jun. 12, 2016.

(51) Int. Cl.
*H04L 29/06* (2006.01)
*H04L 9/08* (2006.01)

(52) U.S. Cl.
CPC ........ *H04L 9/0861* (2013.01); *H04L 63/0421* (2013.01); *H04L 63/0435* (2013.01)

(56) References Cited

U.S. PATENT DOCUMENTS

| | | |
|---|---|---|
| 8,837,719 B2 | 9/2014 | Reffe |
| 2003/0053622 A1 | 3/2003 | Bruen et al. |
| 2011/0064221 A1 | 3/2011 | McSherry et al. |
| 2011/0208763 A1 | 8/2011 | McSherry et al. |
| 2012/0143922 A1 | 6/2012 | Rane et al. |
| 2012/0204026 A1 | 8/2012 | Shi et al. |
| 2012/0296898 A1 | 11/2012 | Cormode et al. |
| 2012/0316956 A1 | 12/2012 | Nath et al. |
| 2013/0145473 A1 | 6/2013 | Cormode et al. |
| 2013/0212690 A1 | 8/2013 | Farwaz et al. |
| 2014/0196151 A1 | 7/2014 | Mishra et al. |
| 2014/0281572 A1 | 9/2014 | Wang et al. |
| 2014/0283091 A1 | 9/2014 | Zhang et al. |
| 2015/0293923 A1 | 10/2015 | Eide et al. |
| 2015/0339493 A1 | 11/2015 | Ioannidis et al. |
| 2015/0371059 A1 | 12/2015 | Bilogrevic et al. |
| 2016/0071170 A1 | 3/2016 | Massoulie et al. |
| 2016/0203333 A1 | 7/2016 | Fawaz et al. |

OTHER PUBLICATIONS

Roy, S. Setty, A. Kilzer, V. Shmatikov, E. Witchel. "Airavat: Security and Privacy for MapReduce." NSDI, 2010.
Cynthia Dwork and Aaron Roth. "The Algorithmic Foundations of Differential Privacy." Foundations and Trends in Theoretical Computer Science, vol. 9, Nos. 3-4, Aug. 2014.
Chao Li and Gerome Miklau. "An Adaptive Mechanism for Accurate Query Answering under Differential Privacy." Proc. VLDB Endowment, pp. 514-525, Feb. 2012.
Fanti, G., Pihur, V. and Erlingsson, Li. "Building a RAPPOR with the Unknown: Privacy-Preserving Learning of Associations and Data Dictionaries." Proceedings on Privacy Enhancing Technologies. vol. 2016, Issue 3, pp. 11-61.
Dwork, C., McSherry, F., Nissim, K, Smith, A. "Calibrating Noise to Sensitivity in Private Data Analysis." Theory of :, ryptography. TCC 2006. Lecture Notes in Computer Science, vol. 3876. Springer, Berlin, Heidelberg.
Vadhan, Salil. "The Complexity of Differential Privacy." Center for Research on Computation & Society John A. Paulson School of Engineering & Applied Sciences Harvard University, Aug. 9, 2016.
Chaudhuri, S., Kaushik, R. and Ramamurthy, R. "Database Access Control & Privacy: Is There a Common Ground?" In: Proceedings of CIDR 2011, pp. 96-103 (2011 ).
Liu, C., Chakraborty, S. and Mittal, P. "Dependence makes you Vulnerable: Differential Privacy under Dependent Tuples. "NOSS '16, Feb. 21-24, 2016.
Ding, B., Winslett, M., Han, J., & Li, Z. "Differentially Private Data Cubes: Optimizing Noise Sources and Consistency." In Proceedings of SIGMOD 2011 and PODS 2011,2011, pp. 217-228.
Mohammed, N., Chen, R., Fung, B., and Yu, P. "Differentially Private Data Release for Data Mining." KDD'11, Aug. 21-24, 2011, pp. 493-501.
J. Hsu, M. Gaboardi, A. Haeberlen, S. Khanna, A. Narayan, B.C. Pierce, and A. Roth. "Differential Privacy: An Economic Method for Choosing Epsilon." Proc. of CSF 2014.
Ebadi, H., Sands, D. Schneider, G. "Differential Privacy: Now it's Gelling Personal." In: POPL 2015, ACM, 2015, pp. 59-81.
Kueyang Hu, et al. "Differential Privacy in Telco Big Data Platform." Proceedings of the VLDB Endowment, 8(12): 1692-1703, 2015.
Alvin, M.S., et al. "Differential Privacy: On the Trade-Off between Utility and Information Leakage." Proceedings of the 8th International Workshop on Formal Aspects of Security & Trust (FAST11 ), Springer, LNCS 7140, 2011.
Haeberlen, Andreas, et al. "Differential Privacy Under Fire." In USENIX'11, 2011.
Narayan, Arjun. "Distributed Differential Privacy and Applications." Presented to the Faculties of the University of Pennsylvania, 2015.
Ning Zhang, Ming Li, and Wenjing Lou. "Distributed Data Mining with Differential Privacy." In IEEE International :; Conference on Communications, 2011.
Narayan, Arjun Ravi, "Distributed Differential Privacy and Applications." Publicly Accessible Penn Dissertations, Jan. 1, 2015.
Hamid Ebadi and David Sands. "Featherweight PINO." CoRR, 2015.
Mohan, Prashanth. "GUPT: Privacy Preserving Data Analysis made Easy," Proceedings of the 2012 ACM SIGMOD International Conference on Management of Data, May 20-24, 2012.
Ikkus, I. et al. "Non-tracking Web Analytics." CCS'12, ACM, Oct. 16-18, 2012.
Lee, Sangmin, et al. "[pi]box: A Platform for Privacy-Preserving Apps." In 1 0th USENIX Symposium on Networked Systems Design and Implementation (NSDI '13),2013.
R. A. Popa, et al. "Privacy and Accountability for Location-based Aggregate Statistics." In Proceedings of the 18th ACM Conference on Computer and Communications Security, Oct. 17-21, 2011.
Kandappu, Thivya, et al. "Privacy in Crowdsourced Platforms." Springer International Publishing: Privacy in a Digital, Networked Wo?d. 2015, pp. 57-84.
Apple Inc. IOS Security Guide—Mar. 2017.
J. M. Abowd. The Challenge of Scientific Reproducibility and Privacy Protection for Statistical Agen-cies. https://www2.census.gov/cac/sac/meetings/2016-09/2016-abowd.pdf, Sep. 15, 2016. Census Scientific Advisory Committee.
R. Bassily and A. Smith. Local, Private, Efficient Protocols for Succinct Histograms. In STOC, 2015.
G. Cormode and S. Muthukrishnan. An improved data stream summary: The count-min sketch and its applications. J. Algorithms, 55(1):58-75, Apr. 2005.
J. C. Duchi, M. Jordan, M. J. Wainwright, et al. Local Privacy and Statistical Minimax Rates. In FOCS. IEEE, 2013.
C. Dwork, M. Naor, T. Pitassi, and G. N. Rothblum. Differential privacy under continual observation. In Proceedings of the Forty-second ACM Symposium on Theory of Computing, STOC '10, pp. 715-724, New York, NY, USA, 2010. ACM.
Ú. Erlingsson, V. Pihur, and A. Korolova. RAPPOR: Randomized Aggregatable Privacy-Preserving Ordinal Response. In ACM CCS, 2014.
M.Gaboardi,J.Honaker,G.King,K.Nissim,J.Ullman,S.Vadhan,andJ.Murtagh.PSI($\Psi$):a Private data Sharing Interface. In Theory and Practice of Differential Privacy, 2016.
J. Hsu, S. Khanna, and A. Roth. Distributed Private Heavy Hitters. In ICALP. 2012.
S. P. Kasiviswanathan, H. K. Lee, K. Nissim, S. Raskhodnikova, and A. Smith. What Can We Learn Privately? SIAM Journal on Computing, 40(3):793-826, 2011.
A. Machanavajjhala, D. Kifer, J. Abowd, J. Gehrke, and L. Vilhuber. Privacy: Theory Meets Practice on the Map. In Proceedings of the 2008 IEEE 24th International Conference on Data Engineering, ICDE '08, pp. 277-286, Washington, DC, USA, 2008. IEEE Computer Society.
F. D. McSherry. Privacy integrated queries: An extensible platform for privacy-preserving data anal-ysis. In Proceedings of the 2009 ACM SIGMOD International Conference on Management of Data, SIGMOD '09, pp. 19-30, New York, NY, USA, 2009. ACM.
N. Mishra and M. Sandler. Privacy via Pseudorandom Sketches. In PODS, 2006.
Z. Qin, Y. Yang, T. Yu, I. Khalil, X. Xiao, and K. Ren. Heavy hitter estimation over set-valued data with local differential privacy. In

(56) References Cited

OTHER PUBLICATIONS

Proceedings of the 2016 ACM SIGSAC Conference on Computer and Communications Security, CCS '16, pp. 192-203, New York, NY, USA, 2016. ACM.
O. Goldreich et al., "How to Construct Random Functions" Journal of the Association for Computing Machinery, vol. 33, No. 4, Oct. 1986. 16 Pages.

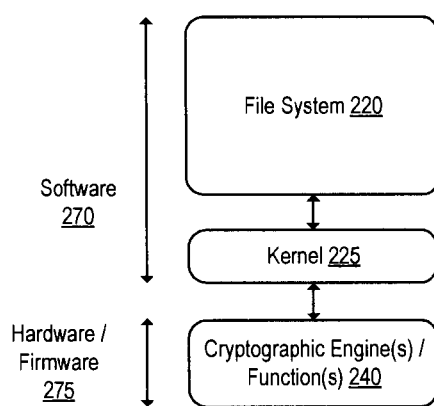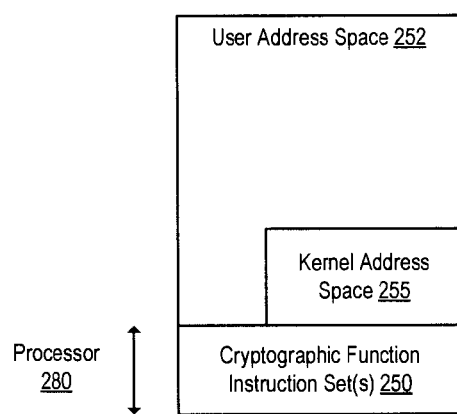
*FIG. 2A*  *FIG. 2B*

390

```
#include <CommonCrypto/CommonDigest.h>
#include <CommonCrypto/CommonCrypto.h>
#include <libkern/OSByteOrder.h>
uint8_t input_hash[CC_SHA256_DIGEST_LENGTH];
uint8_t block[kCCBlockSizeAES128];
size_t j=random_bit_pos;
uint64_t biq_endian=OSSwapHostToBigInt64(j » 7); // // j /
(kCCBlockSizeAES128 * CHAR_BIT);
CCCryptorStatus retval;
CC_SHA256(input, input_byte_len,input_hash);
memset(block,00,sizeof(block));
memcpy(block+8,&big_endian,8);
retval = CCCrypt(kCCEncrypt, kCCAlgorithmAES128, kCCOptionECBMode,
input_hash, sizeof(input_hash), 0, block, sizeof(block), block,
sizeof(block), NULL);
size_t BitPosition = (j & 0x7) // Position in the byte (j mod
CHAR_BIT)
size_t BytePosition= (j » 3) & 0xF // Position of the byte in the
block (j mod kCCBlockSizeAES128*CHAR_BIT) / CHAR_BIT
assert(BitPosition<8);
assert(BytePosition <sizeof(block));
BOOL bitValue = (block[BytePosition] & (1 « BitPosition)) !=0);
```

*FIG. 4*

```
// Vector Generation
#include <CommonCrypto/CommonDigest.h>
#include <CommonCrypto/CommonCrypto.h>
size_t len=-(MAX(random_bit_pos) + (kCCBlockSizeAES128-1)) >> 4; //
ceiling(MAX(random_bit_pos) / kCCBlockSizeAES128)
uint8_t input_x_yector[len];
uint8_t input_hash[CC_SHA256_DIGEST_LENGTH];
uint8_t block[kCCBlockSizeAES128];
CCCryptorRef cryptor;
CCCryptorStatus retval; memset(input_x_vector,0,sizeof(input_x_vector));
memset(block,0,sizeof(block));
CC_SHA256(input, input_byte_len,input_hash);
retval = CCCryptorCreateWithMode(kCCEncrypt, kCCModeCTR, kC-CAlgorithmAES128,
ccNoPadding, block, input_hash, sizeof(in¬put_hash), NULL, 0, 0,
kCCModeOptionCTR_BE, &cryptor);
retval = CCCryptorUpdate(cryptor, input_x_vector, sizeof(in-put_x_vector),
input_x_vector, sizeof(input_x_vector), NULL);
retval =CCCryptorRelease(cryptor);
// For any received data from a client "j"
size_t BitPosition = (j & 0x7) // Position in the byte (j mod CHAR_BIT)
size_t BytePosition=  >> 3) // Position of the byte in the
vector (j / CHAR_BIT)
if (BytePosition>=sizeof(input_x_vector)) {
   error...
}
assert(BitPosition<8);
BOOL bitValue = ((input_x_vector[BytePosition1 & (1 « BitPosition)) != 0);
```

EFFICIENT IMPLEMENTATION FOR DIFFERENTIAL PRIVACY USING CRYPTOGRAPHIC FUNCTIONS

RELATED APPLICATIONS

This application is a continuation of U.S. patent application Ser. No. 15/275,284, filed Sep. 23, 2016, which claims the benefit of U.S. Provisional Patent Application No. 62/349,055, filed on Jun. 12, 2016, the entirety of which is incorporated herein by reference.

TECHNICAL FIELD

This disclosure relates generally to the field of differential privacy. More specifically, this disclosure relates to a system that may utilize cryptographic functions on a client device to implement a 1-bit protocol for differential privacy.

BACKGROUND

As the amount of information collected in an online environment grows, individuals are increasingly protective of providing various forms of information. Accordingly, differential privacy has become an important consideration for providers that aggregate online information. One approach to provide such privacy is to use a randomized response model. A randomized response model provides the advantage of being a client-based privacy solution, and accordingly, does not require reliance upon a trusted third-party server. Accordingly, control over the data is managed by the client device. Such an approach, however, often requires the client device to provide random values, which in certain instances (e.g. where the order of random values reaches the millions) may be resource intensive. Accordingly, an efficient mechanism for providing local privacy is desired.

SUMMARY

This disclosure describes a mechanism and system for achieving local differential privacy. In some embodiments, the system may provide an efficient mechanism for achieving local differential privacy using a random response model that implements a 1-bit protocol. In addition, in some embodiments, the system may leverage specialized encryption mechanisms on a client device to improve the efficiency of the protocol. For example, a client device may utilize hardware-accelerated, or specialized instruction sets, for cryptographic functions to randomize information sent to the server. For instance, the client device may utilize cryptographic hashes such as SHA, SHA1, SHA2, SHA3, MD5, Blake2, or other hashing techniques, as well as block ciphers such as AES, 3DES, or other block cipher techniques.

In one embodiment, described is a method for achieving differential privacy when determining a frequency of values. The method may include identifying a value from a known set of values to transmit to a server, and determining a random bit position. The method may also include randomizing the identified value using a public pseudorandom function that inputs a representation of the identified value and the random bit position and outputs a string of bits. In one embodiment, the cryptographic function may be a block cipher such as an Advanced Encryption Standard (AES) algorithm or a hash function such as a Secure Hash Algorithm (SHA). The method may also include selecting a single bit value from the string of bits at a bit position based on the random bit position, and creating a privatized bit value of the single bit value by performing a biased randomization (e.g., coin flip) operation to determine whether to flip the single bit value. In addition, the method may include transmitting, to a server, the privatized bit value and the random bit position, wherein the server precomputes a vector for each respective value of the known set of values using the public pseudorandom function, identifies one or more of the vectors including a bit matching the single bit value at the bit position based on the random bit position, and updates a frequency estimation of one or more of the known set of values corresponding to the vectors identified.

In another embodiment, described is method for processing information received at a server. The method may include receiving, at the server, a single bit value and a random bit position from a client device, the single bit value representing an output of a cryptographic function performed on the client device to randomize an input from a known set of inputs. The method may include precomputing, at the server, a vector for each respective value of the known set of values using the cryptographic function, and identifying one or more of the vectors including a bit matching the single bit value at a bit position based on the random bit position. Accordingly, the method may include updating a frequency estimation of one or more of the known set of values corresponding to the vectors identified.

In yet another embodiment, described is a device for implementing differential privacy. The device may include a memory storing instructions and a processor coupled to the memory to execute the instructions from the memory. The processor may be configured to identify a value from a known set of values to transmit to a server and determine a random bit position. The device may also randomize the identified value. In one implementation, the device may randomize the identified value using a block cipher (e.g. in counter mode) such as an Advanced Encryption Standard (AES) function that inputs a hash of the identified value as a key and the random bit position as data, and output a single bit value of a resulting ciphertext at a bit position based on the random bit position. In another implementation, the device may randomize the identified value using a hash function such as a Secure Hash Algorithm (SHA) function that inputs a hash of the identified value and the random bit position, and output a single bit value of a resulting hash at a bit position based on the random bit position, wherein the hash function generates both the hash of the identified value and the resulting hash in response to a single function call. The device may also create a privatized bit value of the single bit value by performing a biased randomization (e.g., coin flip) operation to determine whether to flip the single bit value, and transmit, to the server, the privatized bit value and the random bit position.

BRIEF DESCRIPTION OF THE DRAWINGS

Embodiments of the disclosure are illustrated by way of example, and not by way of limitation, in the figures of the accompanying drawings in which like reference numerals refer to similar elements.

FIG. 2A is a block diagram illustrating an example architecture of a client device including hardware-accelerated cryptographic functions according to an embodiment of the disclosure.

FIG. 2B is a block diagram illustrating an example address space architecture of a client device including specialized instruction sets for cryptographic functions according to an embodiment of the disclosure.

FIG. 4 is an example of a client-side AES implementation of a 1-bit protocol according to an embodiment of the disclosure.

FIG. 9 is an example server-side AES implementation of the 1-bit protocol according to an embodiment of the disclosure.

DETAILED DESCRIPTION

Figure 1:
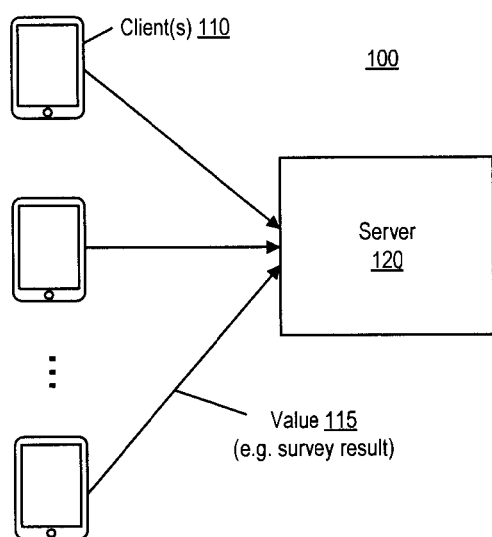
FIG. 1 is a block diagram illustrating an example operating environment according an embodiment of the disclosure.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

In the context of differential privacy, this disclosure relates to protecting privacy in an online data collection environment by using a randomized response model (or a local model for privacy). As described, a randomized response model is a client-based privacy solution that does not rely upon a server to achieve privacy, which means control over the data is managed by the client device. For example, the parameters of a randomized model may limit the ability of a server (e.g. destination of collected information) to determine (within a certain degree of confidence) an individual value received from the client. For example, the client device may perform a biased coin flip operation (or an accept/reject or a true/false operation) to maintain the confidentiality of the true value of information sent individually to the server. Instead, a server may collect this information in aggregate and recover the statistical properties of the set of values as a whole (and thus distributions of individual values) by following a reconstruction procedure (e.g. 1-bit protocol) as further described herein.

The random response model starts with the presumption that each value (or survey result) from a set of client devices (or respondents or individuals) belongs to the same fixed domain, and each value is chosen independently at random from the same fixed probability distribution. To protect privacy, each client hides its own value by applying a randomization algorithm (e.g. pseudorandom function). A server then aims to reconstruct the distribution of the values or derive some statistical properties of this distribution.

Under this general context, described herein is an efficient mechanism for achieving local differential privacy. As described herein, the system may provide an efficient mechanism using the random response model with a 1-bit protocol. In some embodiments, the system may leverage specialized encryption mechanisms on a client device to improve the efficiency of the protocol. For example, a client device may utilize hardware-accelerated or specialized instruction sets for cryptographic functions to randomize information sent to the server. In one embodiment, the client device may utilize cryptographic hashes or block ciphers. Accordingly, in some embodiments, the system provides an efficient mechanism for implementing differential privacy.

FIG. 1 is a block diagram illustrating an example operating environment according an embodiment of the disclosure. As shown, the system 100 may include client devices 110 and a server 120, which may be coupled via a network. The network may be any suitable type of wired or wireless network such as a local area network (LAN), a wide area network (WAN), or combination thereof. As further described herein, the client devices 110 may transmit information (via the network) to the server 120 in a private manner. For example, each client 110 may transmit information (e.g. a value 115) in the form of a single bit value (along with bit position information). The value 115 may essentially be any form of information or a response to a survey. In one embodiment, the value may be any form of information that is finite and from a known set. For example, the known set includes a predefined set of possible values known by the server 120. The value may relate to user interactions on the client device. For example, the value may include one of a set of emojis used by a user, visited websites, deep links, preferences, data from a questionnaire, or any other data that a user may want or request to remain private. As referred to herein, a deep link (or universal link) may include, for example, a link from a search result, that when selected, launches an application installed on a device. When collecting the information, the value 115 may remain private and the server recovers statistical properties of the values based on a reconstruction procedure. Accordingly, differential privacy is maintained when transmitting information to the server 120. It should be noted that the server 120 may be any kind of server or a cluster of servers and may include a cloud-based server, application server, backend server, or combination thereof.

FIG. 2A is a block diagram illustrating an example architecture of a client device including hardware-accelerate cryptographic functions according to an embodiment of the disclosure. As shown, the architecture of the client device (e.g. client device 110) may include software 270 and hardware/firmware 275. For example, as shown the file system 220 and kernel 225 may be part a software component. In one embodiment, the hardware/firmware 275 may include, for example, and one or more cryptographic engines/functions 240. For example, as referred to herein, hardware-accelerated cryptographic functions or engines may reside in this portion of the device. For example, the device may include specialized hardware (e.g. circuitry) for performing encryption/decryption. For instance, this may include an Advanced Encryption Standard (AES) engine or a Secure Hash Algorithm (SHA) engine. Accordingly, in an embodiment, the device may provide a hardware-accelerated mechanism for performing AES or SHA functions.

In addition, the hardware-accelerated cryptographic engines/functions 240 are contemplated to include any implementations in hardware, firmware, or combination thereof, including various configurations. For example, this may include hardware/firmware integrated into the SoC as a separate processor, or included as special purpose CPU (or core), or integrated in a coprocessor on the circuit board, or contained on a chip of an extension circuit board, etc.

FIG. 2B is a block diagram illustrating an example address space architecture of a client device including specialized instruction sets for cryptographic functions according to an embodiment of the disclosure. For example, the client device may include a user address space 252 including a kernel address space 255. In one embodiment, the cryptographic function instruction set 250 may be accessed by a processor 280. The cryptographic function instruction set 250 may include, or work in conjunction with, various cryptographic libraries, APIs, frameworks, protocols, routines, and the like. For example, the device (or the server) may use an instruction set which may be an extension to an instruction set architecture for particular types of processors (e.g. Intel AES New Instructions, or AES-NI). Accordingly, the device may improve the speed of performing cryptographic processes using the above-described specialized mechanisms. It should be noted that the architectures shown above are examples and it should be appreciated that other configurations may also be used with the present disclosure.

In addition, when referring to various functions, variants of those functions are also contemplated unless stated otherwise. For example, AES may include various AES variants, and variants that include different key sizes such as 128, 192, and 256, and different modes of operation (e.g. ECB, CBC, CFB, OFB, CTR, etc.). Similarly, SHA may include various SHA alternatives such as SHA1, SHA2, SHA3, MD5, Blake2, etc. with various bit sizes.

Accordingly, although cryptographic functions are not necessarily required to implement differential privacy, some embodiments herein, may leverage the prevalence of specialized support for cryptographic functions to potentially improve the overall efficiency of implementations as further discussed below.

Overview of a 1-Bit Protocol

To provide a general conceptual context, described is an overview of a 1-bit differential privacy protocol. The disclosure then describes some embodiments that implement this protocol using cryptographic functions.

Further background for the mathematical proofs and theorems related to a 1-bit differential privacy protocol may be found in "*Local, Private, Efficient Protocols for Succinct Histograms*" by Raef Bassily and Adam Smith, the entirety of which is incorporated by reference herein.

Generally, the 1-bit protocol relates to sending a random representation of a value as only 1 bit of information to a server. For example, in one embodiment of the disclosure, the 1-bit protocol may be implemented in the following manner. For instance, the system may represent values using a hash function. In addition, a finite set of N values may be considered. Accordingly, the system may use a cryptographic hash function to generate N representations for the possible values out of P possible representations. In other words, N may define the size of space for the possible values and P may define the size of the space of the hash function output.

For example, the N possible values may be hashed with the SHA256 function to provide N values of hash in the range $[0 \ldots 2^{256-1}]$. Accordingly, the hash provides a low probability of collisions by the hashes. Information may then be randomized by using a public function. For example, the function may receive as input the hash value ("input_hash") along with a random bit position ("random_bit_pos"), and output a single bit value. This bit may be deterministic given input_hash and random_bit_pos, but may be pseudo-random. Accordingly, this process may compute a static matrix of all input_hash and random_bit_pos pairs, and may return a single bit value at a position of the matrix (e.g. at M[input_hash][random_bit_pos]). The client may then modify (or privatize) this bit as the protocol dictates.

Although transmitting only a single bit value (along with a bit position) as an identifier is efficient, the single bit must still be generated using a randomization function. Accordingly, in order to more efficiently generate the random bit (which may be in the order of millions), some embodiments herein may leverage specialized cryptographic functions. Such implementations may be provided on a client device and on a server is discussed further below.

Example Client-Side Implementations

As described above, the 1-bit protocol requires generating a random bit. In one embodiment, the randomization process may utilize a pseudorandom function (PRF). For example, the randomization function may be implemented as follows:

PRF(input_hash, random_bit_pos/s)[random_bit_pos % s]

where [i] denotes the ith bit of the output and s is the size in bits of the PRF's output.

Accordingly, as shown above, the PRF's output range may be $[2^{s-1}]$.

Figure 3:
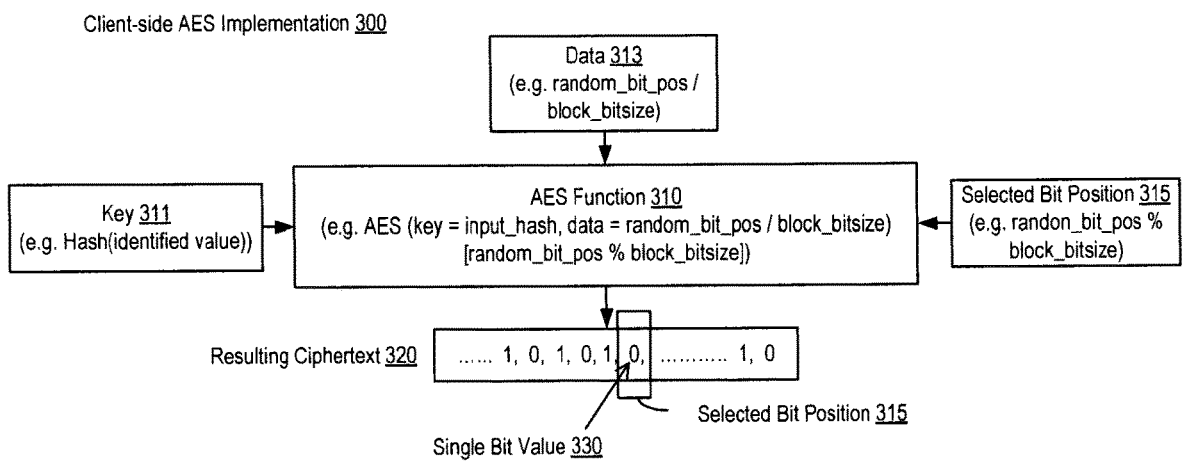
FIG. 3 is a block diagram of an example client-side AES function for the 1-bit protocol according to an embodiment of the disclosure.

In some embodiments, the PRF may leverage specialized functions of a client (or server) device. For example, in one embodiment, the PRF may be implemented as an AES algorithm. FIG. 3 is a block diagram of an example client-side AES function for the 1-bit protocol according to an embodiment of the disclosure. As shown, the client-side AES implementation 300 may include the AES 310 function (or engine), which may receive input including a key 311 and data 313. In addition, a selected bit position 315 of the resulting ciphertext 320 may also be specified. Accordingly, as shown, the single bit value 330 (e.g. "0") at selected bit position 315 may be selected. Accordingly, as shown in this implementation, the PRF(x, y) may be defined as:

AES (key=input_hash, data=random_bit_pos/block_bitsize) [random_bit_pos % block_bitsize].

Thus, in such an embodiment, the AES (e.g. with a block bit size of 128) PRF(x, y) may be defined as:

AES (key=input_hash, data=random_bit_pos/128) [random_bit_pos % 128].

FIG. 4 is an example of a client-side AES implementation of a 1-bit protocol according to an embodiment of the disclosure. Implementation 390 includes example code for the client-side AES implementation according to an embodiment of the disclosure. As shown, the implementation may use cryptographic APIs.

Figure 5:
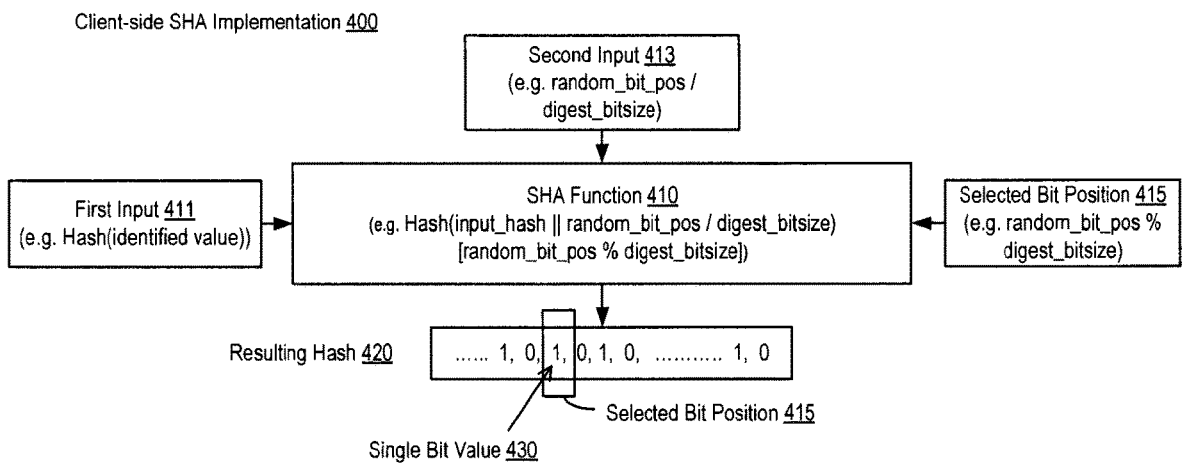
FIG. 5 is a block diagram of an example client-side SHA function for the 1-bit protocol according to an embodiment of the disclosure.

In another embodiment, the PRF may be implemented as a hash function such as SHA. FIG. 5 is a block diagram of an example client-side SHA function for the 1-bit protocol according to an embodiment of the disclosure. As shown, the client-side SHA implementation 400 may include a SHA 410 function (or engine), which may receive input including a concatenation of a first input 411 and a second input 413. In addition, a selected bit position 415 of the resulting hash 420 may also be specified. Accordingly, as shown, the single bit value 430 (e.g. "1") at selected bit position 415 may be selected. Accordingly, as shown in this implementation, the PRF(x, y) may be defined as:

Hash(input_hash||random_bit_pos/digest_bitsize)[random_bit_pos % digest_bitsize].

Thus, in such an embodiment, the SHA (e.g. SHA256) PRF(x, y) may be defined as:

SHA256(input_hash||random_bit_pos/256) [random_bit_pos % 256].

The resulting output (e.g. hash) is a single bit value (0, 1) which may, in one embodiment, be transformed into (−1, 1) by transposition (e.g. (0→−1, 1→1)).

Using a hash function as the PRF may also provide additional benefits. For example, a hash for the PRF function and the hash of the input may be determined (or calculated) with a single call to the hash function, and thus, reducing the amount of processing required by the client device.

It should be noted that in one embodiment, the input to the function described above may include the hash value for the input (e.g. hash(identified value) as the input). In addition, after applying the PRF in any of the above described embodiments, statistical noise may also be applied to the bit. For example, the device may provide statistical noise in any suitable manner as known in the art.

Figure 6:
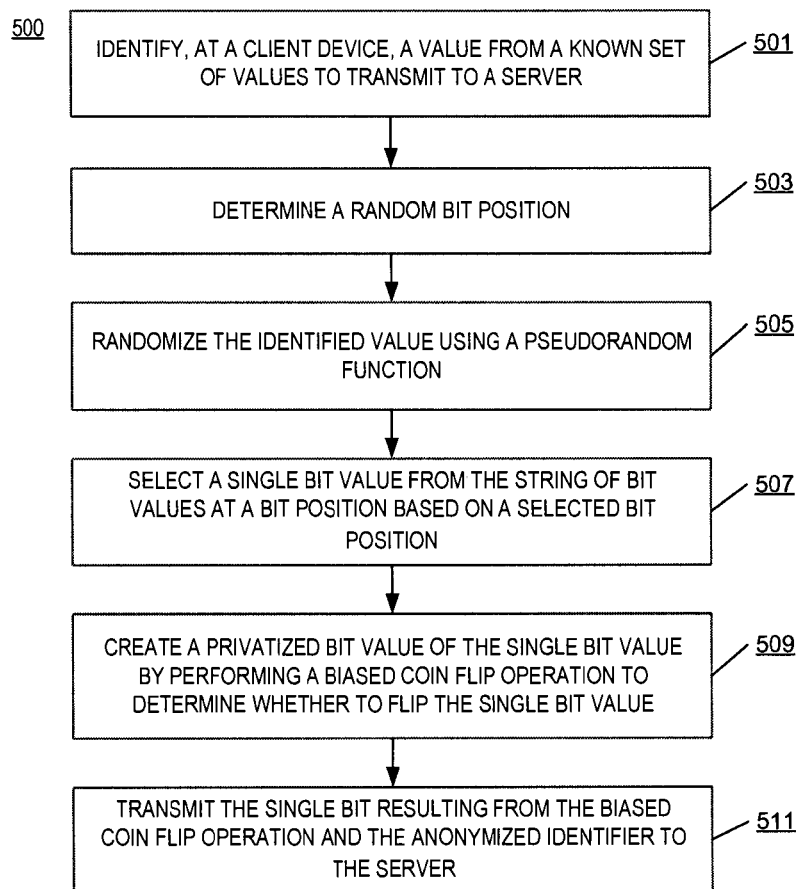
FIG. 6 is an example flow diagram illustrating a method of producing a single bit value for an identified value at a client device according to an embodiment of the disclosure.

FIG. 6 is an example flow diagram illustrating a method of producing a single bit value for an identified value at a client device according to an embodiment of the disclosure. Processes described herein may use processing logic, which may include software, hardware, or a combination thereof. For example, process 500 may be performed by a device (e.g. client device 110).

In operation 501, the device may identify a value (e.g. value 115) from a known set of values to transmit to a server. For example, as described above the value may be a survey result. As described above, the value may also be based on information, for example, related to an interaction of a user associated with the client device. The user may not want to be identified with the particular value, and accordingly, the device may provide a randomized response using the following operations.

In 503, the device may determine a random bit position (e.g. random_bit_pos). In one embodiment, this random bit position may correspond to an anonymized identifier of the client device. The random bit position may be any randomized value (e.g. an integer) that may be created using a suitable randomization technique (e.g. random number generator). Moreover, unlike the pseudorandom function, in some embodiments, the server does not need to know how the random value was generated. As further described, the random bit position may be used to determine a bit position of a string of bits, and accordingly, in one embodiment, the device may provide certain constraints or may convert the value generated (e.g. type of value, range, etc.).

In operation 505, the device may randomize the identified value using a pseudorandom function. The pseudorandom function may be public (e.g. known by the server). In one embodiment, the pseudorandom function may utilize specialized hardware circuitry (or firmware) of the device. For example, the pseudorandom function may be a hardware-accelerated cryptographic function. As described above, in one implementation, the pseudorandom function may be a block cipher (e.g. AES function 310). For example, the block cipher may be used in a counter mode. In addition, in one implementation the pseudorandom function may be a hash function (e.g. SHA function 410). In another embodiment, the device (or server) may use a cryptographic function that is part of a specialized instruction set. For example, the device (or the server) may use an instruction set which may be an extension to an instruction set architecture for particular a type of microprocessors (e.g. Intel AES New Instructions, or AES-NI). Accordingly, the device (or server) may improve the speed of performing the functions described herein using these instruction sets. In operation, the pseudorandom function may input information and output a string of bit values. For example, in one embodiment, the input information may include a representation of the identified value and the random bit position. For example, the pseudorandom function (PRF) may be represented as PRF (x, y), wherein x is the representation of the identified value, and y is the random bit position. In one embodiment, the representation x, for example, may be a hash of the identified value. In one embodiment, the random bit position y, for example, may be the randomized value of the random bit position itself, or a value based on the random bit position (e.g. a calculation). For example, y may be the value from the random bit position divided by the bit size of the output for the function. For example, in an AES implementation, y may be represented as (randomized_bit_pos/block_bitsize), and in an SHA implementation, y may be represented as (random_bit_pos/digest_bitsize). The outputted string of bit values may be structured in various forms including, for example, a ciphertext or a hash value.

In operation 507, the device may select a single bit value (e.g. single bit value 330/430) from the string of bit values at a bit position based on the random bit position. For example, the bit position based on the random bit position may correspond to a selected bit position (e.g. selected bit position 315/415). In one embodiment, the efficient implementation may select the bit value as part of the output of the function. For example, the randomizing operation may receive the selected bit position and the pseudorandom function may output as the string of bits only the single bit value at the selected bit position. In other words, depending on the function, determining all the bits may not be necessary. In one example, only the value at the selected bit position may be determined. In another example, values up to and including the selected bit position may be determined. As referred to herein, output may include the function providing the single bit value, some of the bit values, or all of the bit values as part of the function. In addition, in one embodiment, the single bit value may be deterministic given both the representation and the random bit position.

In operation 509, the device may create a privatized bit value of the single bit value by performing a biased coin flip operation to determine whether to flip the single bit value. For example, the device may perform a biased coin flip operation may result in flipping the bit slightly less than 50 percent of the time (e.g. 0.49). Accordingly, the information sent to the server may be privatized (e.g. unknown true or false).

In operation 511, the device may transmit the privatized bit value resulting from the biased coin flip operation and the random bit position to the server. In one embodiment, only the privatized bit value and the random bit position are transmitted to the server as an identifier for the value from the known set of values. For example, as described herein no other information may be revealed to the server regarding the source of the information aside from the privatized bit value and the random bit. The server (e.g. server 120) may also perform operations to process the received information. For example, as further described below, in one embodiment, the server may precompute a vector for each respective value of the known set of values using the public pseudorandom function. The server may also identify one or more of the vectors including a bit matching the single bit value at the bit position based on the random bit position, and the server may also update a frequency estimation of one or more of the known set of values corresponding to the vectors identified.

Figure 7:
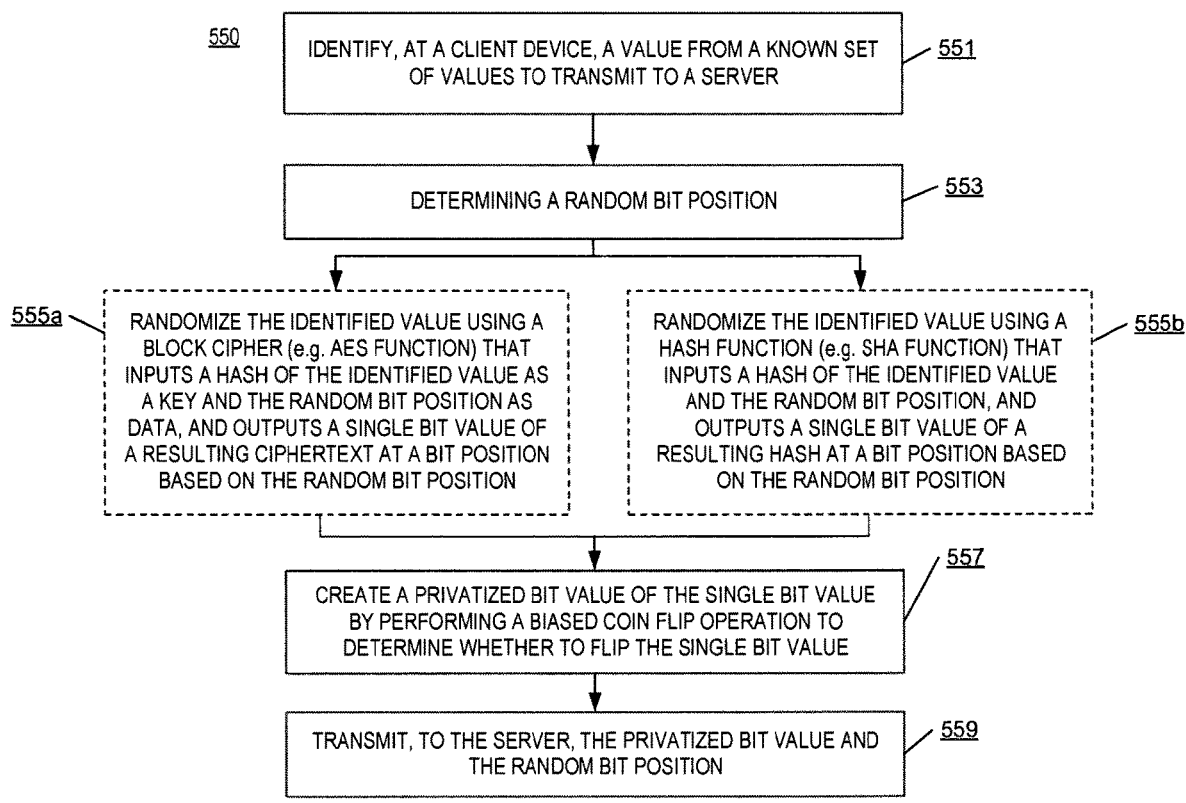
FIG. 7 is an example flow diagram illustrating a method of producing a single bit value using specialized mechanisms according to an embodiment of the disclosure.

FIG. 7 is an example flow diagram illustrating a method of producing a single bit value using specialized mechanisms according to an embodiment of the disclosure.

Process 550 may be performed by a device (e.g. client device 110). In operation 551, the device may identify a value from a known set of values to transmit to a server. In 553, the device may determine a random bit position. The random bit position may be any randomized value (e.g. an integer) that is created using a suitable randomization techniques (e.g. random number generator). As further described, the random bit position may be used to determine a bit position of a string of bits, and accordingly, in one embodiment, the device may provide certain constraints or may convert the value generated (e.g. type of value, range, etc.).

In operation 555a/b, the device may randomize the identified value. In one embodiment (555a), the device may randomize the identified value using a block cipher that inputs a hash of the identified value as a key and the random bit position as data, and outputs a single bit value of a resulting ciphertext at a bit position based on the random bit position. In one embodiment, the block cipher may include an Advanced Encryption Standard (AES) function. In another embodiment (555b), the device may randomize the identified value using a has function that inputs a hash of the identified value and the random bit position, and outputs a single bit value of a resulting hash at a bit position based on the random bit position. In one embodiment, wherein the hash function may generate both the hash of the identified value and the resulting hash in response to a single function call. In one embodiment, the hash function may include a Secure Hash Algorithm (SHA) function.

In some embodiments, the pseudorandom function may utilize specialized hardware circuitry (or firmware) of the device. For example, the pseudorandom function may be a hardware-accelerated function. In addition, in some embodiments, the device may use a function that is part of a specialized instruction set. For example, the device (or the server) may use an instruction set which may be an extension to an instruction set architecture for particular a type of microprocessors. Accordingly, the device (or server) may improve the speed of performing the functions described herein using these instruction sets.

In operation 557, the device may create a privatized bit value of the single bit value by performing a biased coin flip operation to determine whether to flip the single bit value. For example, the device may flip the single bit value slightly less than 50 percent of the time. It should be noted that other privatization techniques may also be used, in addition to, or as an alternative to the biased coin flip operation described above. In 559, the device may transmit the privatized bit value and the random bit position to the server. The server (e.g. server 120) may also perform operations to process the received information as described above.

Example Server-Side Implementations

In order for the server (e.g. server 120) to recover the statistical properties of the collected bit values, the server may perform a reconstruction procedure. For example, the server may calculate outputs of the pseudorandom function for all of the known set of values (e.g. for each of the potential survey results). In one embodiment, rather than performing the same operation as the client device, the server can precompute the full or partial vectors corresponding to each of the possible values. For example, for each input k and all of the possible values of random_bit_pos, the server may precompute the vector of PRF(k, random_bit_pos), indexed by random_bit_pos. For example, using the PRFs described above, this operation may be performed efficiently as described below.

Figure 8:
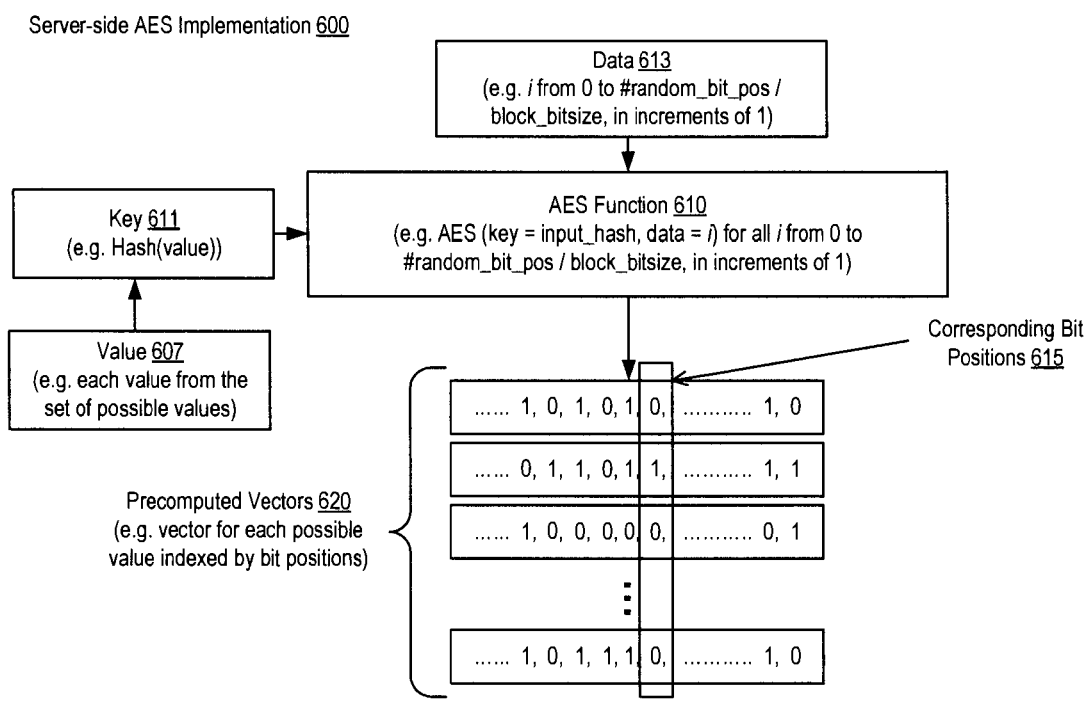
FIG. 8 is a block diagram of an example server-side AES function of the 1-bit protocol according to an embodiment of the disclosure.

In one embodiment, the vectors may be precomputed with a corresponding AES algorithm. FIG. 8 is a block diagram of an example server-side AES implementation of the 1-bit protocol according to an embodiment of the disclosure. As shown, the server-side AES implementation 600 may include the AES 610 function (or engine). In one embodiment, the AES function 610 may be repeated to precompute a set of vectors 620 as the concatenation of the output of the AES function 610. Accordingly, the AES function 610 may receive as input a key 611 value 607 for each value from the set of possible values, and data 613 i as input for all i from 0 to the number of random bit positions divided by the block bit size in increments of 1. Accordingly, when the server receives information from the client (e.g. privatized bit and random bit position), the server may look up the bit values at the corresponding bit position 615 for each of the possible values (e.g. value 607). Accordingly, as shown in this implementation, vectors may be computed efficiently as the concatenation of the output of AES as follows:

AES(key=input_hash, data=i) for all i from 0 to #random_bit_pos/block_bitsize by increments of 1.

This provides an even more efficient mechanism as it may be implemented by reusing the computation made in AES-CTR mode. FIG. 9 is an example server-side AES implementation of the 1-bit protocol according to an embodiment of the disclosure. Implementation 690 includes example code for the server-side AES implementation according to an embodiment of the disclosure.

Figure 10:
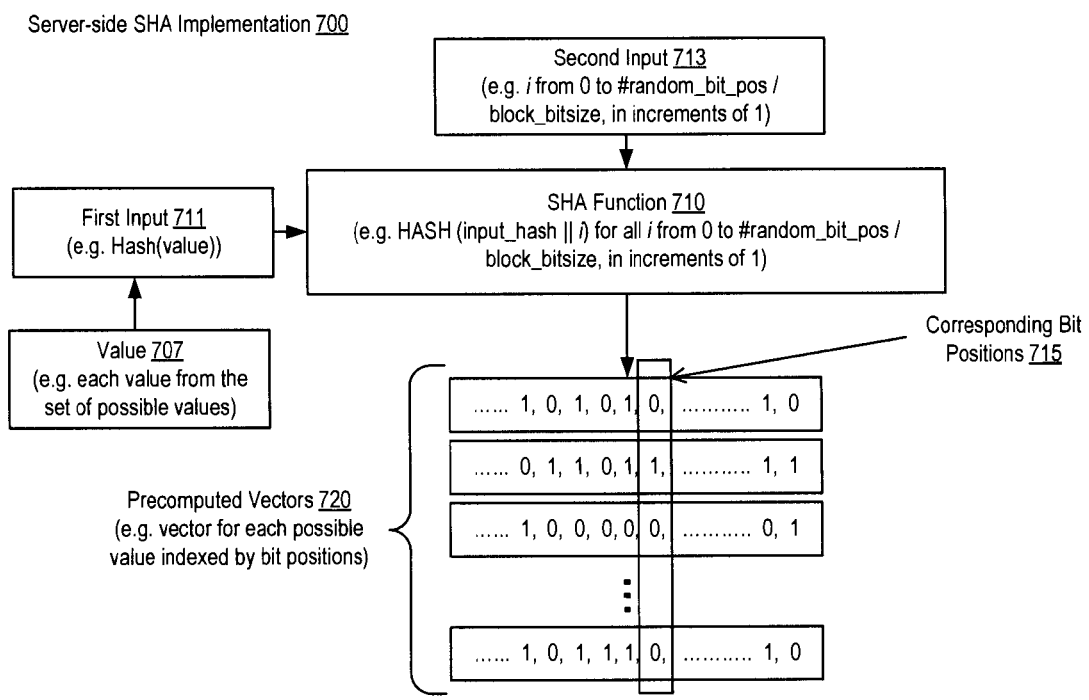
FIG. 10 is a block diagram of an example server-side SHA function of the 1-bit protocol according to an embodiment of the disclosure.

In one embodiment, the vectors may be precomputed with a corresponding HASH function. FIG. 10 is a block diagram of an example server-side SHA implementation of the 1-bit protocol according to an embodiment of the disclosure. As shown, the server-side SHA implementation 700 may include the SHA 710 function (or engine). In one embodiment, the SHA function 610 may be repeated to precompute a set of vectors 720 to precompute the set of vectors. Accordingly, the SHA function 710 may receive a hash of the value as a first input 711 for each value 707 from the set of possible values, and as a second input 713, i for all i from 0 to the number of random bit positions divided by the block bit size in increments of 1. Accordingly, when the server receives information from the client (e.g. privatized bit and random bit position), the server may look up the bit values at the corresponding bit position 715 for each of the possible values (e.g. value 707). For example, the vectors may be computed as follows:

Hash(input_hash||i) for all i from 0 to #random_bit_pos/block_bitsize by increments of 1.

Accordingly, this structure may correspond to the structure of a Key Derivation Function (KDF), such as the KDF defined in the ANSI x9.63 or NIST SP800-56 standards. For example, in systems where such algorithms have been implemented, this provides an effective alternative to the AES-based approach.

Figure 11:
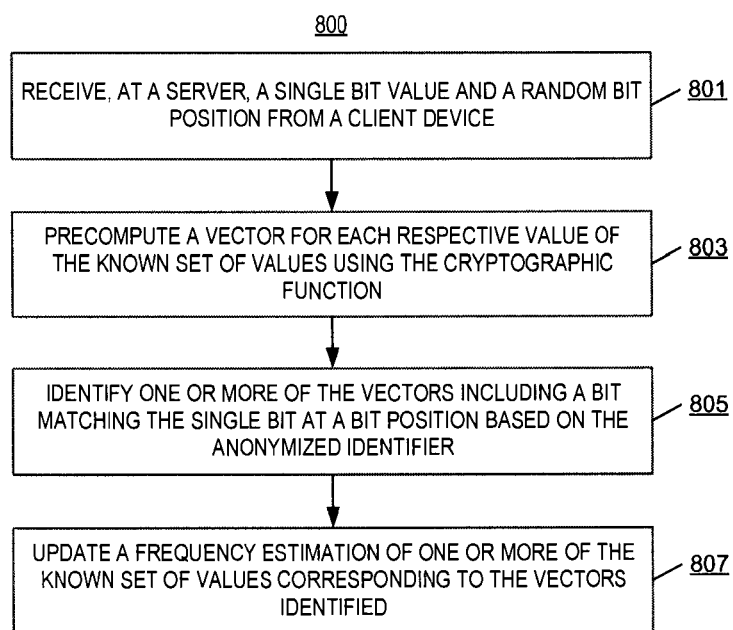
FIG. 11 is an example flow diagram illustrating a method of processing the single bit value at a server according to an embodiment of the disclosure.

FIG. 11 is an example flow diagram illustrating a method of processing the single bit value at a server according to an embodiment of the disclosure. Process 800 may be performed, for example, by a server (e.g. server 120).

In operation 801, the server may receive a single bit value (e.g. the privatized bit value) and a random bit position from a client device. In one embodiment, the server may receive only the single bit value and a random bit position or the selected bit position as an identifier for a value. The single bit value may represent an output of a cryptographic function performed on the client device to randomize an input from a known set of inputs.

In operation 803, the server may precompute a vector for each respective value of the known set of values using the cryptographic function (e.g. precomputed vectors 620). In one embodiment, the vector for each respective value may be an output concatenation of a string of bits from the cryptographic function that inputs the representation of the respective value with each possible value of the random bit position. In addition, in one embodiment, the cryptographic function may be block cipher such as an Advanced Encryption Standard (AES) algorithm or a hash function such as Secure Hash Algorithm (SHA).

In operation 805, the server may identify one or more of the vectors including a bit matching the single bit value at a bit position (e.g. corresponding bit position 715) based on the random or selected bit position. In operation 807, the server may update a frequency estimation of one or more of the known set of values corresponding to the vectors identified. In one embodiment, the frequency estimation may be part of a frequency distribution estimation that is within a predictable margin of error of an actual frequency distribution for the known set of values.

In one embodiment, the server may determine bit positions in an efficient manner. Due to the potential size of the vectors (e.g. millions of bit values) the server may process the bit values using a batch processing technique. For example, the server may determine bit values at particular bit positions at specific interval times. In another example, the server may determine bit values at particular bit positions by analyzing certain blocks of bit positions. Moreover, as described above, the server may reuse calculations (e.g. AES-CTR mode) when analyzing bit positions. In one embodiment, the server may perform various calculations to determine a frequency for a particular value. For example, the server may perform a summation calculation for all the vectors with a matching bit value. In addition, the summation calculation may include a weighted sum determination.

It should be noted that there may be variations to the flow diagrams or the steps (or operations) described therein without departing from the embodiments described herein. For instance, the steps may be performed in parallel, simultaneously, a differing order, or steps may be added, deleted, or modified.

Figure 12:
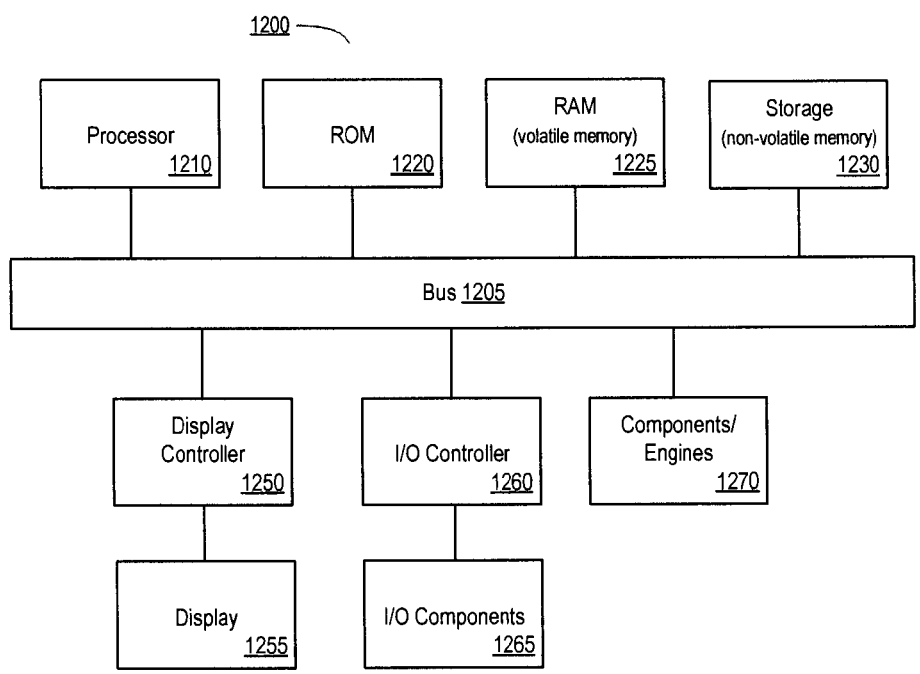
FIG. 12 is a block diagram illustrating an example computing system that may be used in conjunction with one or more of the embodiments of the disclosure.

FIG. 12 is a block diagram illustrating an example computing system that may be used in conjunction with one or more of the embodiments of the disclosure. For example, computing system 1200 (or system, or computing device, or device) may represent any of the devices or systems (e.g. client device 110 or server 120) described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor 1210 may retrieve stored instructions from one or more of the memories 1220, 1225, and 1230 and execute the instructions to perform processes, operations, or methods described herein. These memories represent examples of a non-transitory machine-readable medium or storage containing instructions which when executed by a computing system (or a processor), cause the computing system (or processor) to perform operations, processes, or methods described herein. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Modules 1270 (or components, units, functions, or logic) may represent any of the functions or engines described above, such as, for example, the cryptographic engine 240. Modules 1270 may reside, completely or at least partially, within the memories described above, or within a processor during execution thereof by the computing system. In addition, modules 1270 can be implemented as software, firmware, or functional circuitry within the computing system, or as combinations thereof.

In addition, the present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing survey results as described above, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory machine-readable medium storing instructions which, when executed by one or more processors of an electronic device, cause the electronic device to perform operations for differential privacy when determining a frequency of values, the operations comprising:
    identifying a value from a known set of values to transmit to a server;
    determining a randomized bit position within a representation of the identified value;
    outputting a set of bits by randomizing the identified value using a pseudorandom function that inputs the representation of the identified value and the randomized bit position within the representation of the identified value;
    selecting a bit value from the set of bits at a bit position based on the randomized bit position;
    creating a privatized bit value of the bit value by performing a biased randomization operation to determine whether to flip the bit value; and
    transmitting, to the server, the privatized bit value and the randomized bit position, wherein the server precomputes a vector for values of the known set of values using the pseudorandom function, identifies one or more vectors including a bit matching the privatized bit value at the bit position based on the randomized bit position, and updates a frequency estimation of one or more of the known set of values corresponding to one or more identified vectors.

2. The non-transitory machine-readable medium of claim 1, wherein transmitting the privatized bit value and the randomized bit position to the server includes transmitting only the privatized bit value and the randomized bit position as an identifier for the value from the known set of values.

3. The non-transitory machine-readable medium of claim 1, wherein the pseudorandom function is a cryptographic function that is hardware-accelerated on the electronic device.

4. The non-transitory machine-readable medium of claim 3, wherein the cryptographic function is a block cipher or a hash function.

5. The non-transitory machine-readable medium of claim 4, wherein the block cipher is an Advanced Encryption Standard (AES) algorithm or the hash function is a Secure Hash Algorithm (SHA).

6. The non-transitory machine-readable medium of claim 1, wherein the pseudorandom function uses a specialized cryptographic instruction set for a processor of the electronic device.

7. The non-transitory machine-readable medium of claim 6, wherein the specialized cryptographic instruction set includes a cryptographic function, and wherein the cryptographic function is a block cipher or a hash function.

8. The non-transitory machine-readable medium of claim 7, wherein the block cipher is an Advanced Encryption Standard (AES) algorithm or the hash function is a Secure Hash Algorithm (SHA).

9. The non-transitory machine-readable medium of claim 1, wherein the representation of the identified value is a hash value from a cryptographic hash function.

10. The non-transitory machine-readable medium of claim 1, wherein randomizing the identified value includes receiving the bit position and the pseudorandom function outputs only the bit value at the bit position as the set of bits.

11. The non-transitory machine-readable medium of claim 1, further comprising applying statistical noise to the privatized bit value before transmitting the privatized bit value to the server.

12. The non-transitory machine-readable medium of claim 1, wherein the known set of values includes user interaction data for one or more users of the electronic device.

13. An electronic device comprising:
    a memory to store instructions; and
    one or more processors coupled to the memory to execute the instructions, wherein the instructions cause the one or more processors to:
        identify a value from a known set of values to transmit to a server;
        determine a randomized bit position within a hash representation of the identified value;
        randomize the identified value via a cryptographic function, the cryptographic function to receive the hash representation of the identified value as a key and the randomized bit position as data, and output a bit value of a resulting ciphertext at a bit position based on the randomized bit position;
        create a privatized bit value of the bit value by performing a biased randomization operation to determine whether to flip the bit value; and
        transmit, to the server, the privatized bit value and the randomized bit position, wherein the server precomputes a vector for each respective value of the known set of values using the cryptographic function, identifies one or more vectors including a bit matching the privatized bit value at the bit position based on the randomized bit position, and updates a frequency estimation of one or more of the known set of values corresponding to the vectors identified.

14. The electronic device of claim 13, wherein only the privatized bit value and the randomized bit position are transmitted to the server as an identifier for the value from the known set of values.

15. The electronic device of claim 13, wherein the cryptographic function is an Advanced Encryption Standard (AES) function.

16. The electronic device of claim 15, wherein the one or more processors include a specialized AES instruction set, the specialized AES instruction set including the AES function.

17. The electronic device of claim 13, wherein the server is to precompute a vector for each respective value of the known set of values using an AES function.

18. The electronic device of claim 13, wherein the hash representation is determined using one of a SHA, SHA1, SHA2, SHA3, or MD5.

19. The electronic device of claim 13, wherein the hash representation is determined using a hardware-accelerated hash function or a specialized instruction set for a hash function.

20. The electronic device of claim 13, wherein the randomized bit position received as data is calculated as the randomized bit position divided by a bit size of the ciphertext, and the bit position is calculated as the randomized bit position modulo a bit size of the ciphertext.

21. The electronic device of claim 13, wherein the cryptographic function is a Secure Hash Algorithm (SHA) function, the resulting ciphertext is a resulting hash, and the SHA function generates both the hash of the identified value and the resulting hash in response to a single function call.

22. The electronic device of claim 21, wherein the server is to precompute a vector for each respective value of the known set of values using a SHA function.

23. The electronic device of claim 21, wherein the SHA function is hardware-accelerated on the electronic device or the processor includes a specialized SHA instruction set, the specialized SHA instruction set including the SHA function.

24. The electronic device of claim 21, wherein the randomized bit position received as data is calculated as the randomized bit position divided by a bit size of the resulting hash, and the bit position is calculated as the randomized bit position modulo the bit size of the resulting hash.

25. A data processing system on a server device, the system comprising:
a memory to store instructions; and
one or more processors coupled to the memory to execute the instructions, wherein the instructions cause the one or more processors to perform operations comprising:
receiving, at the server device, a bit value and a randomized bit position from a client device, the bit value representing an output of a cryptographic function performed on the client device to randomize an input from a known set of inputs, wherein the randomized bit position is a position with a representation of the input from the known set of inputs;
precomputing a vector for each respective value of the known set of values using the cryptographic function;
identifying one or more vectors including a bit matching the bit value at a bit position based on the randomized bit position; and
updating a frequency estimation of one or more of the known set of values corresponding to the one or more identified vectors.

26. The data processing system of claim 25, wherein the bit value is a privatized bit value.

27. The data processing system of claim 25, wherein the cryptographic function is a block cipher or a hash function.

28. The data processing system of claim 25, wherein the frequency estimation is part of a frequency distribution estimation that is within a predictable margin of error of an actual frequency distribution for the known set of values.

29. The data processing system of claim 25, wherein the frequency estimation for a particular value is calculated based on a weighted sum determination.

30. The data processing system of claim 25, wherein the frequency estimations are updated using a batch processing technique.

31. The data processing system of claim 25, wherein the vector for each respective value is an output concatenation of a set of bits from the cryptographic function that inputs the representation of the respective value with each possible value of the randomized bit position.

* * * * *